United States Patent

[11] 3,613,803

[72] Inventor  Jackie O. Payne
               5155 N. Fresno Apt. 197, Fresno, Calif. 93726
[21] Appl. No. 858,831
[22] Filed     Sept. 17, 1969
[45] Patented  Oct. 19, 1971

[54] RIPPER FOR DISRUPTING HARDPAN AND THE LIKE
     2 Claims, 10 Drawing Figs.
[52] U.S. Cl. .................................................. 172/699, 37/193, 172/23, 74/847
[51] Int. Cl. ..................................................... A01b 13/08, A01b 3/68
[50] Field of Search............................................ 172/23, 699, 671, 204, 215; 37/193; 74/843, 847

[56]                    References Cited
                   UNITED STATES PATENTS
| | | | |
|---|---|---|---|
| 29,201 | 7/1860 | Stafford......................... | 37/193 |
| 106,721 | 8/1870 | Peterson....................... | 37/193 |
| 301,686 | 7/1884 | Creamer........................ | 37/193 |
| 330,724 | 11/1885 | Montgomery................ | 37/193 |
| 1,324,937 | 12/1919 | Smith ........................... | 172/215 |
| 2,153,038 | 4/1939 | Corbett ......................... | 172/699 |
| 2,280,014 | 4/1942 | Thomas et al. ............... | 172/699 |
| 2,439,743 | 4/1948 | McEwen ....................... | 172/699 |
| 2,619,054 | 11/1952 | Bell............................... | 37/193 |
| 2,860,426 | 11/1958 | Allin et al. ..................... | 172/671 |
| 3,090,458 | 5/1963 | Wolf.............................. | 74/847 |

FOREIGN PATENTS
| | | | |
|---|---|---|---|
| 1,069,961 | 5/1967 | Great Britain................ | 37/193 |

OTHER REFERENCES

Fowler, Steam Cultivation, 8- 1902, pp. 24, 25, and front cover.

Primary Examiner—Robert E. Pulfrey
Assistant Examiner—C. W. Hanor
Attorney—Huebner & Worrel

ABSTRACT: A ripper for disrupting hardpan, plowpan, compacted soil and the like, characterized by the utilization of a plurality of fluid-cooled, hardpan ripper chisels, mounted on a horizontally displaceable support, a prime mover, including a power plant mounted on a transport vehicle, and tackle interconnecting the prime mover with the support; a feature of the invention being the employment of a power driven winch operatively coupled, through an assemblage of cables and sheaves with the support in a manner such that, as the winch is driven by the power plant, the support is drawn toward the winch for thereby causing the chisels to penetrate the work area as a closing between the support and the winch is achieved.

JACKIE O. PAYNE
INVENTOR

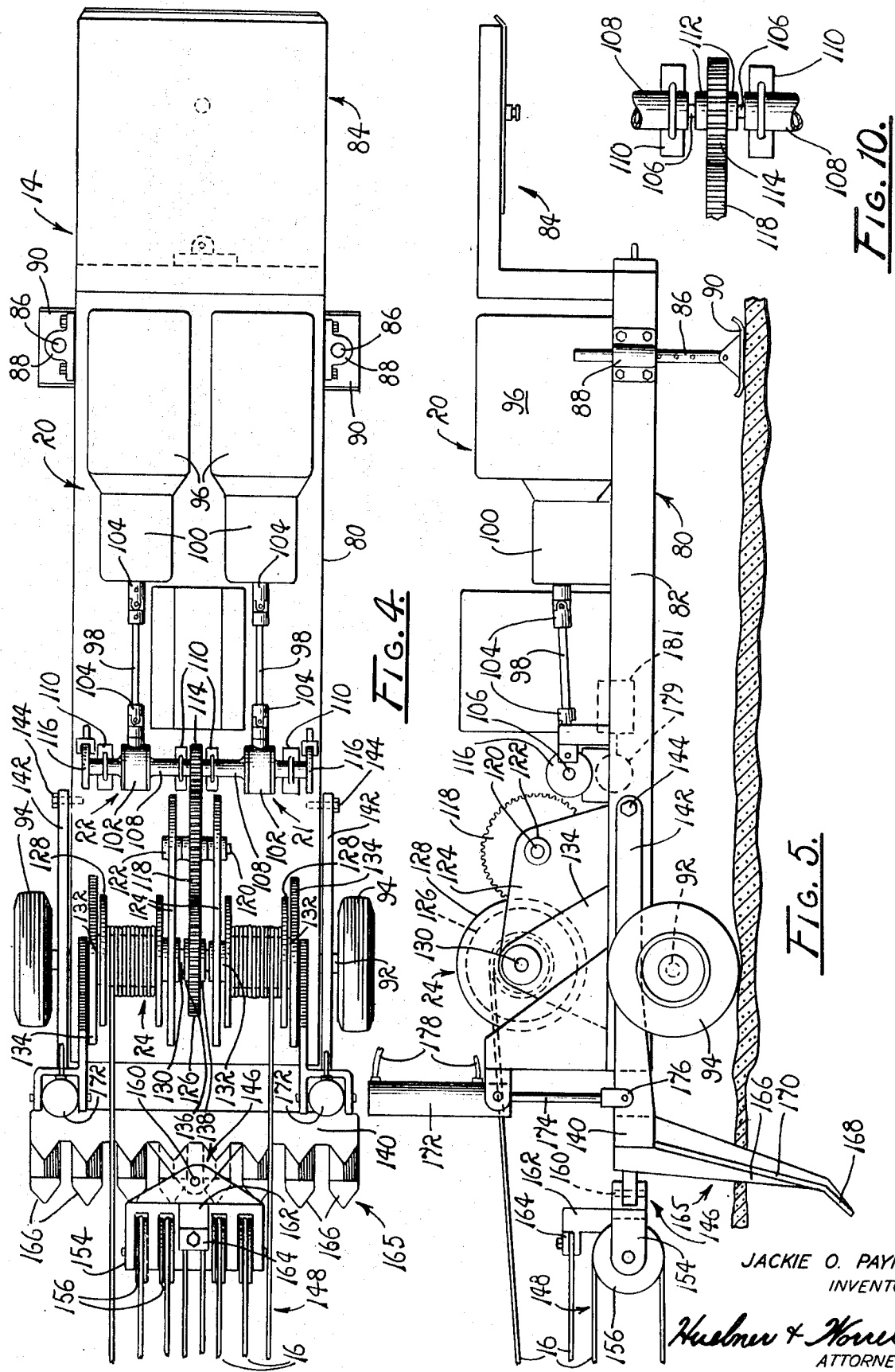

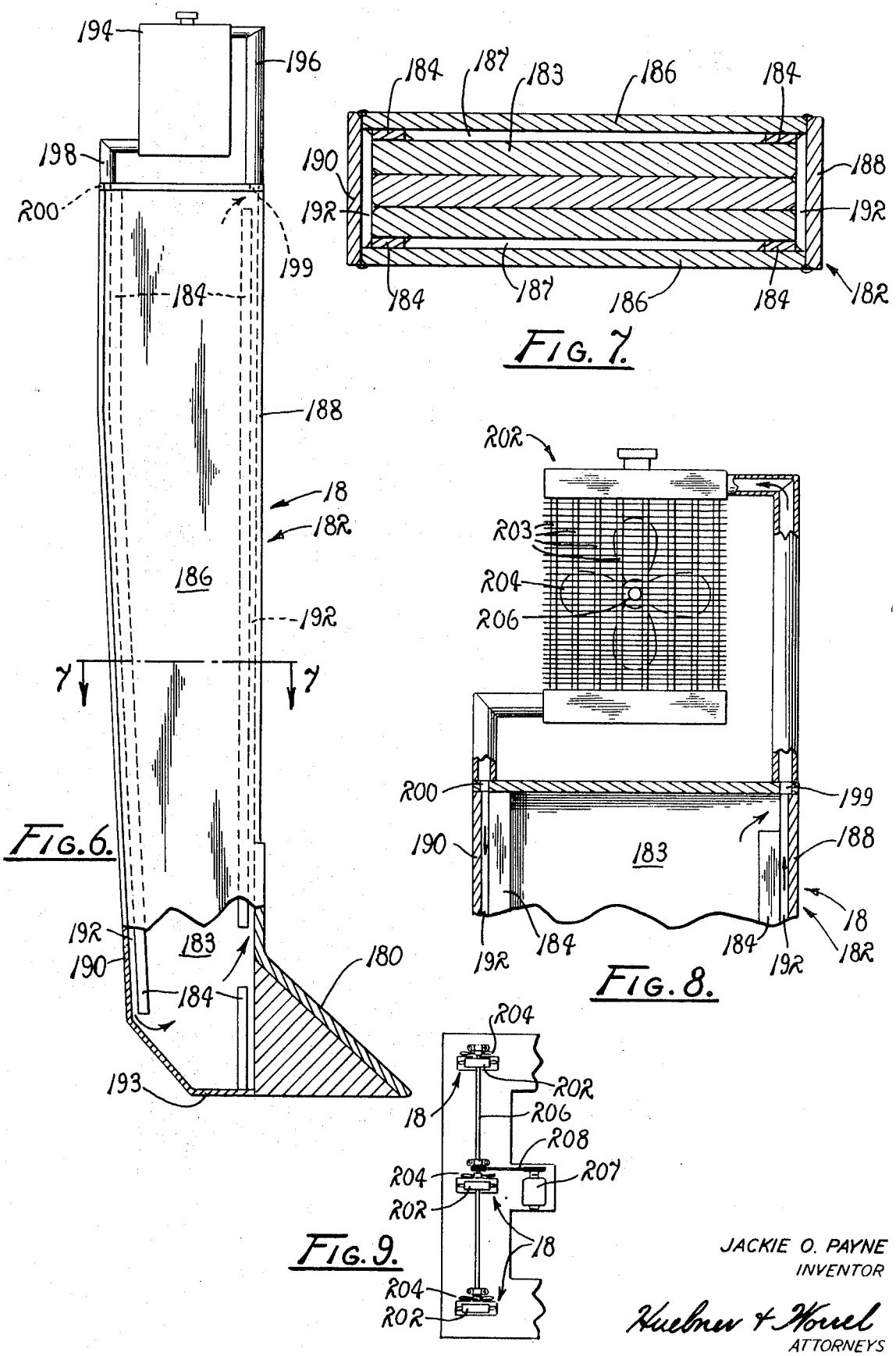

RIPPER FOR DISRUPTING HARDPAN AND THE LIKE

BACKGROUND OF THE INVENTION

The invention relates to a system for working soils and more particularly to a method and a ripper for disrupting compacted soils, hardpan and the like by drawing support-mounted chisels toward a stationary prime mover.

The prior art includes numerous soil-working devices which are adapted to penetrate soils to preselected depths for disrupting hardpan, compacted subsoils and the like. Such devices frequently are referred to as "subsoilers" and "hardpan rippers" and include one or more vertically extended, elongated teeth, frequently called "chisels," supported by a tractor-borne mount. In operation, the mount serves to force the chisels into the soil thus causing the chisels to penetrate to preselected depths for disrupting the hardpan or compacted subsoil in order to enhance the soil's crop-producing characteristics, drainage or other desired function.

In certain agricultural areas the hardpan or subsoil exists at a depth which permits ready access thereto and is of a composition which accommodates a ready disruption through relatively simple and lightweight structures. In other areas, the hardpan is located at significant depths beneath the surface of the top soil, composed of heavy soil, which necessitates the use of relatively large and complex equipment having massive power capabilities. In such instances, the chisels employed are of extremely rugged construction and several feet in length and capable of penetrating heavy soils to significant depths. In these instances, large track-laying tractors are employed in mounting and drawing the chisels through the soil.

In instances where excessively large tractors are required for hardpan-ripping operations, the number of chisels which concurrently may be drawn by a given tractor is limited by the tractor's power output capabilities. This limitation is aggravated by the fact that hardpan-ripping and subsoiling operations normally are carried on during seasons in which the soil is subjected to rainfall. The rainfall produces surface water and causes the surface of the soil to become wet, slippery and generally hostile to the use of large tractors. Consequently, hardpan-ripping operations become quite difficult when employing systems heretofore available for these operations.

Furthermore, it is important to note that through friction, heat is generated within the chisels during hardpan-ripping operations and that the resulting temperatures of the chisels are excessive. Therefore, in operation, chisels tend to lose their temper or, conversely, tend to become quite brittle and are subject to cracking and breaking as they strike objects such as large rocks frequently prevalent in agricultural areas. The result is that extensive and expensive chisel repair continuously must be conducted during hardpan-ripping operations.

SUMMARY OF THE INVENTION

This invention overcomes the aforementioned difficulties through the use of a novel ripper for disrupting hardpan and the like by employing a stationary prime mover and a displaceable support or drag, having mounted thereon water-cooled ripper chisels.

Accordingly, objects of the instant invention are to provide an improved ripper for disrupting hardpan, plowpan, compacted soil and the like.

Another object is to provide an improved ripper which utilizes a stationary prime mover and a laterally displaceable drag for drawing chisels through a work area.

Another object is to provide in a ripper, fluid-cooled chisels whereby the deleterious heating effect imposed through frictional engagement with the soil is obviated or minimized.

These together with other objects and advantages will become more readily apparent by reference to the following description and claims in light of the accompanying drawings.

BRIEF DESCRIPTION OF THE DRAWINGS

FIG. 4 is an enlarged plan view of the prime mover shown in FIG. 1, illustrating an arrangement of a power train for a power plant and an associated gear train employed by the prime mover for driving a cable takeup winch.

FIG. 5 is a side elevation of the prime mover shown in FIG. 4.

FIG. 6 is a partially sectioned side elevation of fluid-cooled chisel and its cooling system which, where preferred, is employed by the hardpan ripper shown in FIG. 1.

FIG. 7 is a cross-sectional view taken on line 7—7 of FIG. 6.

FIG. 8 is a partially sectioned, enlarged view of a modification of a cooling system for the chisel shown in FIG. 6.

FIG. 9 is a fragmentary view of a ripper employing the cooling system illustrated in FIG. 8.

FIG. 10 is a fragmentary view of a portion of the power plant's power train, illustrating a coupling of the output thereof with the input of the winch.

DESCRIPTION OF THE PREFERRED EMBODIMENT

Figure 1:
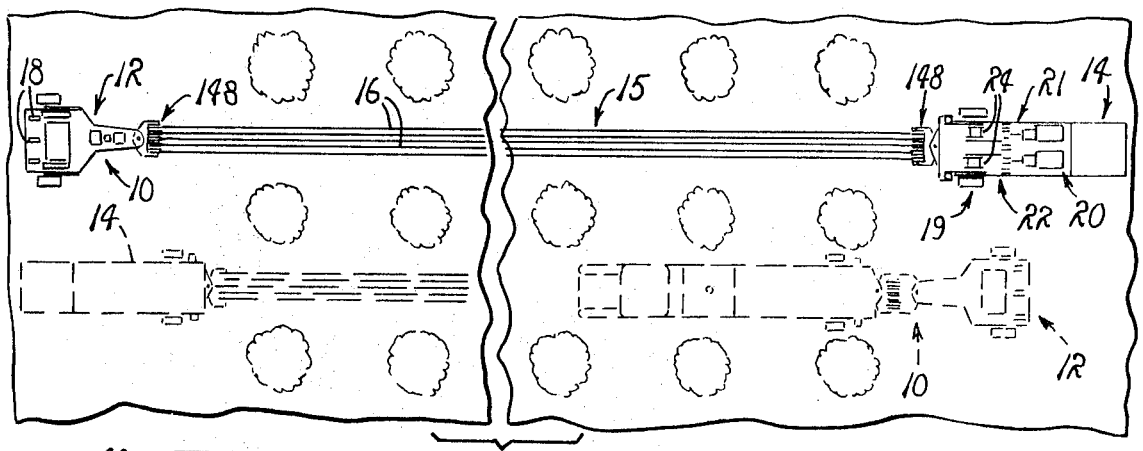
FIG. 1 is a diagrammatic view illustrating alternate operative disposition of a drag and a prime mover employed by the ripper which embodies the principles of the present invention.

Turning now to FIG. 1, a hardpan ripper, generally designated 10, is illustrated in an operative configuration within a given area which, as illustrated, is an agricultural crop producing area. The ripper includes a drag 12 and a prime mover 14 interconnected with the drag through a block and tackle coupling 15 which includes a plurality of lengths of cables 16. The drag 12 includes a plurality of downwardly extended chisels 18, while the prime mover 14 is provided with a drag recovery system 19. The recovery system includes a power plant 20 operatively connected through a power train 21 and gear train 22, with a winch 24 to which is connected the lengths of cables 16.

Figure 2:
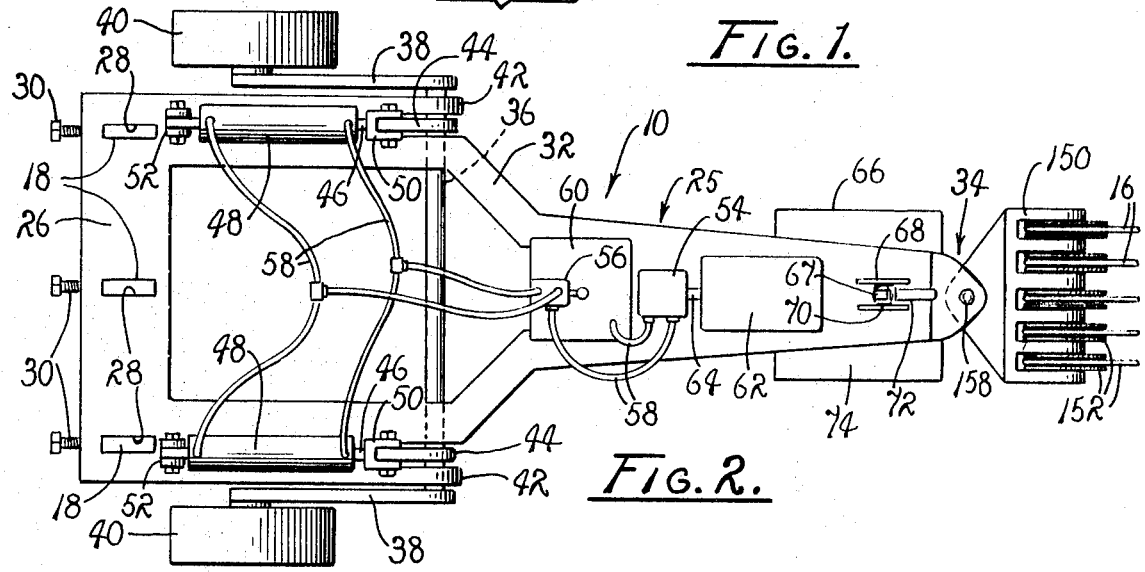
FIG. 2 is a somewhat enlarged plan view of the drag, illustrated in FIG. 1.
Figure 3:
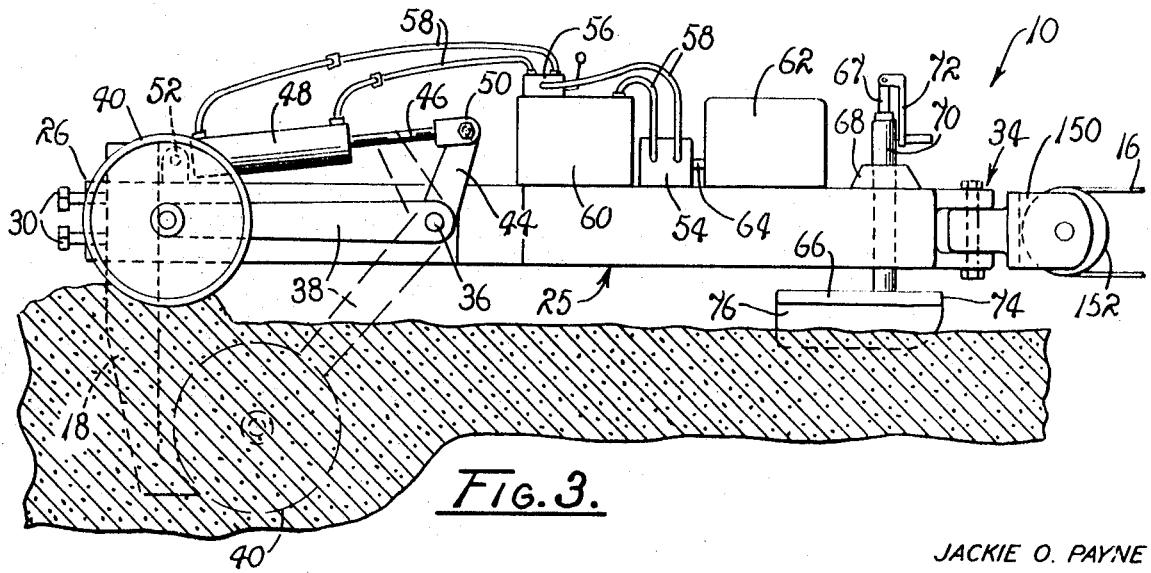
FIG. 3 is a side elevation of the drag shown in FIG. 2.

The drag 12, as illustrated in FIGS. 2 and 3, is formed as a horizontally disposed frame 25. The frame includes a chisel-mounting, transversely extended bar 26 which, in turn, includes a plurality of suitably dimensioned openings 28 adapted to receive therein the shanks of the chisels 28 for retaining the chisels in a vertical disposition relative to the frame. The chisels 18, once inserted in the bar 26, are secured in place through a plurality of locking devices 30. The locking devices, as employed, are configured as setscrews 30 which are tightened in a suitable manner for purposes of securing the shanks of the chisels in place so that the chisels rigidly are secured to the frame and extend downwardly therefrom a distance sufficient to accommodate a penetration of the hardpan disposed beneath the surface of the body of soil. The frame 25 also includes forwardly extended beams 32 which terminate in a clevis coupling 34 through which the drag 12 is coupled to the prime mover 14.

Extended transversely through the beams 32, near the center of mass for the drag, there is a drag supporting axle 36 which terminates at its opposite ends in radially extended, parallel arms 38. At the distal end of each of the arms 38 there rigidly is secured a laterally extended wheel-supporting axle, not designated, of a design which serves to mount one of a pair of drag-supporting wheels 40 thereon. In practice, the wheels 40 are mounted by an arrangement of bearing races, of any suitable design. Since such arrangements are well known, a detailed description is omitted in the interest of brevity. However, it is to be understood that when the axle 36 is rotated in a first direction, the wheels 40 are disposed in a frame-supporting disposition relative to the frame 25 of the drag 12 in order to accommodate an inoperative transport of the drag. However, when the axle is rotated in an opposite direction, the arms 38 are reversely displaced for thereby elevating the wheels relative to the frame 25 so that the weight of the frame is caused to be supported by the chisels 18. Since the center of mass for the drag is forward of the chisels, the chisels are oriented in a soil penetrating disposition as the wheels are elevated.

Therefore, it should be appreciated that the axle 36 is, in operation, selectively oscillated so that as it is rotated, in a first direction, the frame 25 of the drag 12 is caused to be supported by the wheels 40, and as it is rotated in a second direction, the frame is lowered into an operative position, whereby an insertion of the chisels 18 into the soil is achieved as translation is imparted to the drag.

In order to achieve the desired oscillation of the axle 36, the axle is mounted in suitable bearings 42 fixed to the beams 32. Near the opposite ends of the axle 35 there is provided a parallel pair of radially extended arms 44. These arms are angularly displaced, about the axis, relative to the adjacent arms 38. To the distal end of each of the arms 44, there is coupled a reciprocable hydraulic actuator output shaft 46. The shafts 46 are driven by a pair of double-acting hydraulic actuators 48 of any suitable design. Each of the shafts 46 is coupled with an arm 44 through a convenient clevis coupling 50, while the opposite end of each of the actuators 48 is pinned to a beam 32 through a clevis coupling including a clevis pin 52. Therefore, by alternately pressurizing the pair of double-acting actuators 48, the shafts 46 are reciprocated for imparting oscillatory rotational positioning to the axle 36.

Consequently, where it is desired that the chisels 18 be inserted into the soil as the drag 12 is displaced in lateral translation, the wheels 40 are elevated, simply by selectively pressurizing the pair of actuators 48, and when the chisels 18 are to be withdrawn from the soil, the wheels 40 are displaced downwardly by reversely pressurizing the actuators 48 for driving the axle 36 in a reverse direction of rotation. While various means may be employed in controlling the pair of actuators 48, a power driven hydraulic pump 54 is connected with the actuators through a common selector valve 56 and a plurality of pressure lines 58.

In practice, the pump 54 is of a commercially available type and is interposed between a fluid reservoir 60 and the pair of actuators 48, in order to accommodate a pressurization of the actuators 48 through a manipulation of the valve 56. A motor 62, including a small internal combustion engine, is connected with the pump 54 through a suitable drive coupling including a drive shaft 64. Since such drive couplings and their functions are well known, a detailed description is not deemed necessary for providing a complete understanding of the instant invention.

Near the leading portion of the drag 12, adjacent to the clevis coupling 34, there is rotatably received a vertical support 66 secured to the beams 32 through a bracket 68. In practice, the support 66 includes a screw-threaded shaft 67, while the bracket 68 is welded to the beams and includes an internally threaded sleeve 70 receiving the shaft of the support 66 therein. A crank handle 72 is pivotally coupled with the upper end of the shaft 67 in a manner such that the shaft may be extended or retracted relative to the plane of the drag 12, simply by rotating the shaft through manipulation of the handle 72.

Near the lowermost end of the support 66 there is mounted a laterally extended plate 74 which, in effect, serves to receive a vertically disposed bladelike shoe 76 in depending relation. The depth of the shoe 76 is sufficient to permit the shoe to penetrate the surface of the soil and function in a manner quite similar to a rudder for achieving directional control over the leading portion of the drag 12. In that event that directional control is not required, the shoe 76 may be rendered ineffective simply by retracting the threaded shaft 67 relative to the threaded sleeve 70 by manually manipulating the handle 72.

Turning now to FIG. 4, the prime mover 14 is mounted on a flat bed 80. The flat bed 80 is of a design frequently employed in the trucking industry. Normally, such flat beds include a pair of load-supporting side rails 82 and a fifth wheel coupling 84. The coupling 84 serves to couple the flat bed with the fifth wheel of a trucklike tractor or similar vehicle. The flat bed 80 is further provided with forward stationary supports including a pair of vertical shafts 86 coupled with the side rails 82 through brackets 88, also of any suitable design and located near the leading portion rails. At the lowermost end of each of the shafts 86 there is secured a shoe 90. While the shoes 90 are employed for supporting the forward end of the flat bed 80, it should be employed in lieu of the support shafts 86 and the associated shoes 90. For example, it is entirely feasible to employ the prime mover 14 while the flat bed 80 is operatively coupled with the fifth wheel of a tractor.

The trailing end of the flat bed is provided with a suitable axle 92 having mounted thereon a plurality of wheels 94 disposed at opposite sides of the flat bed for facilitating a transporting of the power plant 20 between various locations so that the prime mover 14 may selectively be positioned in an operative disposition, relative to the drag 12 at selected locations.

The power plant 20 is of a design suitable for driving the winch 24. As presently employed, the power plant includes a pair of internal combustion engines 96 mounted on the flat bed 80. The output of each of the engines 96 is coupled to the output gear train 22 through an input power train 97 including therein a drive shaft 98, an automatic transmission 100, and a power output differential 102, also of any suitable design. As a practical matter, each of the drive shafts 97 includes a pair of universal joints 104 for accommodating a coupling thereof within the power train 97.

The output gearing of each of the differentials 102 is coupled with a pair of laterally extended, foreshortened axles 106. These axles serve as an input to the gear train 22. As a practical matter, the axles 106 are supported within a suitable housing 108 secured to the flat bed 80 through a supporting bracket 110, FIG. 10. Hence, it should be appreciated that each of the engines 96 is provided with a power train quite similar to the power trains commonly employed in automotive vehicles and that these trains collectively establish the power train 21 for the power plant 20.

The axles 106 are arranged in transverse coaxial alignment so that each of the engines is provided with both an inboard and outboard axle. The inboard axles are extended from the differentials 102 and terminate in input couplings 112 provided at opposite sides of an input gear 114 for the gear train 22, while each of the outboard axles extend from the associated differential 102 and terminates in a brake 116.

In practice, the design of the brake 116 may be varied as found desirable for given operative requirements. However, it has been found, for most purposes, an hydraulically actuated shoe-and-drum brake assembly functions quite satisfactorily. Since these devices are well known, a detailed description is omitted, however, it should be appreciated that, as the drums of the brakes 116 are permitted to rotate freely, no significant torque is applied to the input gear 114, and that, as the brakes 116 are activated for arresting rotation of the associated outboard axles, a driving torque is applied, through the inboard axles 106, to the input gear 114 for driving the gear in selected rotation. Due to the inclusion of the automatic transmissions 100 within the power train 21, the engine output loads are balanced so that a similar torque is imparted by each of the engines to the input gear 114.

Disposed in mated engagement with the input gear 114 there is an idler gear 118 mounted on a suitable shaft 120 operatively supported by bearings 112 secured to vertical support plates 124. The gear 118 is mated with a gear train gear 126 which simultaneously drives a pair of takeup spools 128 of the winch 24. The spools 128 are securely mounted on a common drive shaft 130 which is rigidly coupled to the flat bed 80 by suitable bearings 132. The bearings 132 are disposed at the outermost ends of the shaft 130 and are coupled in vertical support plates 134. Additionally, a pair of journal bearings 136 is provided and mounted in the support plates 124. While various coupling means may be employed for operatively coupling the shaft 130 with the output gear 126, a welded collar 138 serves quite satisfactorily for this purpose. By mounting the idler gear 118 between the input gear 114 and the output gear 126 a selected gear ratio for the output of the gear train 22 readily may be established. For example, a gear ratio of 36 to 1 has been found practical and is established simply by establishing a 36 to 1 ratio between the circumferences of the mated gears.

Of course, it is entirely possible to maintain a single takeup spool in lieu of the presently employed pair of spools 128, as well as to employ a power train driven by a single engine. However, it is important to appreciate that as a practical matter the cables 16 are quite costly. Therefore, by employing a pair of coaxially aligned and simultaneously driven spools, the lengths of the cables may be reduced to one-half, so that in the event one of the cables is separated it readily may be replaced at a more economical cost. Likewise, by employing a plurality of engines, the number thereof may be increased, as desired, whereby the delivered horsepower may economically be increased simply by increasing the number of engines employed.

At positions rearwardly of the flat bed 80 and extended transversely with respect to the longitudinal axis thereof, there is provided a pull-bar 140 for the drag 12. The pull-bar 140 rigidly is coupled through a pair of parallel pivot beams 142 coupled to the opposite sides of the flat bed 80 through suitable pivot pins 144. These pins, in practice, accommodate a vertical oscillation of the pull-bar. The pull-bar, in turn, is provided with a rearwardly extended clevis 146 which, like the clevis coupling 34, serves to couple the drag 12 with the prime mover 14.

The clevises 34 and 146 of the drag 12 and the prime mover 14, respectively, are interconnected by threading the cables 16 through a first block 150, of the block and tackle coupling 15, including therein a plurality of coaxially aligned sheaves 152, a second block 154, which also includes a plurality of coaxially aligned sheaves, designated 156. The block 150 is coupled with the clevis 34 through a clevis pin 158, while the block 154 is coupled with the clevis 146 by a clevis pin 160.

The cables 16 are threaded through the blocks and about the sheaves 152 and 156, in any suitable manner, with one end of each of the cables being attached to a spool 128, while the opposite ends thereof are attached to one of the blocks 150 and 156. As illustrated, the cables 16 are extended through the sheaves 152 and secured to a bracket 162, including a clamp 164 mounted on the block 154. Therefore, by driving the spools 128 in rotation, each of the cables 16 is caused to be wound about or taken up about one of the spools in a manner which affords a mechanical advantage for the winch 24 in accordance with well-known principles. It is to be understood that the number of sheaves employed may be varied as desired in order to increase or decrease the mechanical advantage afforded the winch.

In addition to being supported by the beams 142, the pull-bar 140 is supported by a brake 165 in order to preclude displacement of the prime mover 14 toward the drag 12. This brake is provided through the use of a plurality of depending feet 166 welded or otherwise rigidly secured to the bar 140. Each of the feet 166 is of an elongated configuration and extends downwardly for a distance sufficient to penetrate the surface of the soil to significant depths. In practice, each foot includes a downwardly extended toe 168 which is of a shovel configuration in order to assist the foot in a penetration of the soil. Each of the feet preferably includes a pair of laterally extended wings 170 in order that they may present a surface area to act against the body of the soil and thus assist in securing the pull-bar 140 in a stationary position relative to the drag 12 as it operatively is translated across the surface of the soil. The specific number of the feet employed is a matter of convenience, however, it is to be understood that the number must be sufficient to provide a foot-soil interface having a surface area substantially greater than the surface area of the chisel-soil interface of the chisels 18 as the chisels are brought into operative relationship with the body of the soil.

As a practical matter, an hydraulic actuator 17 is coupled with each of the beams 142, through its output shaft 174, at a clevis coupling 176. These actuators are adapted to impart rectilinear reciprocation to he shafts 174 for thus elevating and depressing the pull-bar 140 and the associated feet 166. In practice, each actuator 172 is driven through an hydraulic system including a plurality of pressure lines 178 and a suitable pump 179 connected with an hydraulic reservoir 181. Preferably, a suitable selector valve, not shown, is included in the system between the pump 179 and the actuator 172 in a manner quite similar to that in which the selector valve 56 is incorporated in the hydraulic system extending between the pump 54 and the actuators 48. The pump 179 is driven through a gear train, not shown, coupled with the input gear 114. Hence, it is to be understood that the pull-bar 140 is, in operation, elevated and depressed through activation of the hydraulic actuators 172 operating in response to a selective hydraulic output obtained from the pump 179.

In the view of the foregoing, it should be apparent that the function and operation of each of the operative devices of the hardpan ripper 10 can be achieved through a selective manipulation of a plurality of types of control devices. For example, the engines 96, if desired, can be throttled employing a manual throttle, the transmissions 100 can be engaged by a manually actuated lever for effecting a drive of the differentials 102, and the brakes 116 may be controlled through manually actuated mechanical linkages. Likewise, the selector valve 56 is mounted on the drag 12 may be manually actuated. However, it should also be appreciated that where desired, electrical control circuits including a plurality of electrically driven solenoids may be employed in lieu of manually manipulated control linkage. Since such circuits and control systems are readily available and are of many suitable designs, a detailed description thereof is omitted.

Furthermore, since in operation the drag 12 and the prime mover 14 are separated through significant distances, as much as a quarter of a mile or more, radio links may be employed between the two units by utilizing commercially available radio transmitters and receivers appropriately mounted and interconnected with control circuits to achieve remote control of selected components.

It is important to note that each of the chisels 18 is intended to penetrate the soil and hardpan to a significant depth. Hence, during periods of operation, each of the chisels experiences a rapid rise in its temperature due to the heating effect of friction. In order to overcome the deleterious effects of elevated temperatures, the chisels 18 are, where desired, fabricated in a manner such that a fluid cooling thereof is readily effected.

As best illustrated in FIG. 6, each of the chisels 18 includes a foot 180 mounted at the lowermost end of a chisel shank 182 and is so inclined as to establish a soil-penetrating toe, not designated. The shank includes a central, load-bearing leg 183, which preferably is of a laminated construction. About the periphery of the shank, spacer strips 184 are provided and secured to the leg, through welding or the like. To these strips there is secured a relatively thin outer plate 186 which serves as side fairings for the shank and defines a chamber between the innermost surface thereof and outermost surface of the load-bearing leg. The plates 186 are provided with planar dimensions greater than those of the leg and therefore extend beyond the lateral edges of the leg and therefore extend beyond the lateral edges of the leg in order that fore and aft plates 188 and 190 may be secured thereto for establishing a fore and aft chamber 192. The chambers collectively surround the leg 183 and communicate with a fluid reservoir 194 through a pair of conduits 196 and 198. The conduits are coupled in a fluid conduction relationship with the chambers at hot water port 199 and cold water port 200.

Therefore, it is to be understood that a flow of coolant is circulated downwardly, through the aft chamber 192 via the conduit 198 and the cold water port 200, and thence upwardly, through the chambers 187 and 192 via the hot water port 199 and conduit 196, so that heat generated and transmitted from the outer surfaces of the plates 186 and 188 is conducted and removed by circulating a coolant.

As a practical matter, the plates 186 and 188 are formed of a wear-resistant alloy for minimizing wear. Where water is employed as the coolant, the fluid passing through the conduit 196 to the reservoir 194 often is in its vapor state, while the fluid passing from the reservoir 194 through the conduit 198 is in its liquid state. Consequently, a circulation of the water is achieved as it is heated within the cooling chambers and cooled at the reservoir 194 in the nature of a heat pump.

In order to expedite the cooling effect of the coolant, it has been found practical to employ a cooler 101 having radiator conduits 203 of a type similar to that employed in removing heat form the water of water-cooled engines. In such instances, a fan 204 is provided and mounted by means including an elongated, bearing-supported shaft 206 extending the length of the bar 26, in order to enchance the cooling characteristics of the cooler. Preferably, a motor 207 and belt and sheave drive couplings 208 are provided for driving the shaft 206 at selected rates. Where desired, it is entirely possible to employ the internal combustion engine 62 for the purpose of driving the coupling 208 as well as driving the pump 54 of the hydraulic system mounted on the drag 12.

OPERATION

It is believed that in view of the foregoing description, the operation of the device will readily understood, however, it will be briefly reviewed at this point. With the drag 12 and the prime mover 14 of the ripper 10 interconnected through the cables 16, of the block and tackle 15, and positioned in close proximity an operator actuates the selector valve 56 for causing the wheels 40 to descend to a level beneath that of the frame 25 upon which the chisels 18 are mounted in order to impart transport mobility to the drag. With a suitable vehicle coupled to the flat bed 80, through the fifth wheel coupling 84, the ripper 10 is delivered to a selected portion of a field or other area of soil having a hardpan or the like to be disrupted.

As illustrated in FIG. 1, the drag 12 is positioned in a first location while the prime mover 14 is delivered to a second location, remote from the drag with the cables 16 being extended therebetween. As a practical matter, the selector valve 56 is manipulated for driving the wheels upwardly to permit the toes of the feet 180 of the chisels 18 to engage the surface of the soil. Once the flat bed 80 is appropriately positioned relative to the drag, the pair of engines 96 are activated for driving the axles 106, through the differentials 102 and the pair of automatic transmissions 100, whereby a rate of rotation is imparted to the axles. At this time, the brakes 116 simultaneously are applied to the outboard axles, whereupon the inboard axles serve to impart a rate of rotation to the input gear 114. This input is imparted through the gear train 22, including the gears 118 and 126 to the shaft 130.

As the gear 126 is driven, the spools 128 are rotated by the drive shaft 130, whereupon the cables 16 are wound thereabout. As the cables 16 are wound about the spools, they are drawn through the sheaves 152 and 156 of the blocks 150 and 154, respectively. This multiple-sheave coupling serves to provide a selected mechanical advantage for the spools as they wind the cables thereabout.

As the cables are wound about the spools 128, the drag 12 is advanced along the surface of the body of soil, whereupon the chisels 18 are forced downwardly through the soil and into the subterranean hardpan, plowpan or the like.

As the drawing of the drag 12 is initiated, the feet 166 are forced downwardly into the surface of the soil for rigidly positioning the pull-bar 40 relative to the surface of the soil. Continued driving of the spools 12 of the winch 24 serves to draw the drag 12 towards the prime mover 14 at a closing rate determined by the speed at which the engines 96 drive the input gear 114. Since the speed at which the drag is displaced is varied according to soil conditions, the speed at which the engines 96 are driven also is varied as required by operating conditions. As the drag advances, the shoe 76 serves to slice into the upper layers of the surface of the soil and thereby acts as a rudder to impart control over lateral displacement of the leading portion of the drag.

In instances where the chisels 18 are coupled with a cooling system, heat generated through a frictional engagement of the chisels with the soil is dissipated through a circulation of the cooling fluid through the chambers 187 and 192. Further, the heat, if desired, is extracted from the fluid employing the cooler 202.

As the drag 12 completes a hardpan-ripping operation and approaches the prime mover 14, the selector valve 56 again is actuated for causing the actuator 48 to effect a lowering of the wheels 40. As the wheels 40 are lowered into engagement with the surface of the soil, the chisels 18 are extracted therefrom. Once the chisels have been fully extracted from the soil and the drag is disposed in contiguous relationship with the prime mover 14, the ripper 10 is repositioned in an adjacent area and the hardpan-ripping cycle repeated.

In view of the foregoing, it should readily be apparent that the present invention provides a practical solution to the problem of disrupting hardpan and the like, even though extremely wet conditions prevail which otherwise would preclude the performance of such operations by conventional methods and systems.

Although the invention has been herein shown and described in what is conceived to be the most practical and preferred method and apparatus, it is recognized that departures may be made therefrom within the scope of the invention.

Having described my invention, what I claim as new and desire to secure by Letters Patent is:

1. A ripper comprising:
   A. means including a rigid frame constructed to be displaced along a surface of a given penetrable body;
   B. a chisel supported by said frame and extended therefrom for penetrating and disrupting said body as the frame is displaced along said surface;
   C. a stationary prime mover;
   D. means coupling the prime mover with the frame for displacing the frame along said surface in response to an activation of said prime mover; and
   E. a cooling system associated with said chisel, including a fluid circuit comprising,
      1. means defining within said chisel chambers having passages adjacent the walls thereof,
      2. a fluid-filled reservoir connected with said chambers for supplying fluid thereto; and
      3. means connecting said chambers and said reservoir for circulating said fluid through said chambers.

2. The ripper of claim 1 wherein said reservoir comprises:
   A. a radiator; and
   B. a driven fan mounted adjacent to said radiator and operatively associated therewith for delivering a flow of air through said radiator for effecting a cooling of said fluid.